(12) United States Patent
Li et al.

(10) Patent No.: US 7,339,356 B1
(45) Date of Patent: Mar. 4, 2008

(54) APPARATUS AND METHOD FOR CONTROLLING A POWER CONVERTER DEVICE

(75) Inventors: Qiong M. Li, Allen, TX (US); Jeffrey W. Berwick, Sunnyvale, CA (US); Eric Christophe Labbe, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 43 days.

(21) Appl. No.: 11/479,035

(22) Filed: Jun. 30, 2006

(51) Int. Cl.
*G05F 1/10* (2006.01)
*G05F 1/40* (2006.01)
*H02H 7/00* (2006.01)

(52) U.S. Cl. ..................... 323/222; 323/282
(58) Field of Classification Search ............... 323/222, 323/223, 225, 265, 268, 271, 282, 283, 285; 363/50, 55; 361/18
See application file for complete search history.

(56) References Cited

U.S. PATENT DOCUMENTS

| | | | | |
|---|---|---|---|---|
| 5,444,358 A | * | 8/1995 | Delepaut | 323/222 |
| 5,572,112 A | * | 11/1996 | Saeki et al. | 323/282 |
| 5,804,950 A | * | 9/1998 | Hwang et al. | 323/222 |
| 5,982,160 A | * | 11/1999 | Walters et al. | 323/282 |
| 6,967,851 B2 | * | 11/2005 | Yang et al. | 363/16 |
| 7,224,149 B2 | * | 5/2007 | Endo | 323/222 |
| 7,256,569 B2 | * | 8/2007 | Wu et al. | 323/222 |

* cited by examiner

*Primary Examiner*—Matthew V. Nguyen
(74) *Attorney, Agent, or Firm*—Wade J. Brady, III; Frederick J. Telecky, Jr.

(57) ABSTRACT

An apparatus for controlling a power converter operating in response to a modulating signal during successive switching cycles includes: (a) A signal sensor coupled with the converter and sensing an extant signal during the extant cycle. (b) A signal level predictor coupled for receiving a reference signal and establishing a predicted level for the extant switching cycle. (c) A comparer coupled with the signal sensor and the signal level predictor for presenting a first output signal when the extant signal and the predicted signal level have a first relationship and for presenting a second output signal when the extant signal and the predicted signal level have a second relationship. (d) A control unit coupled with the comparer and with the converter for interrupting presentation of the modulating signal to the converter device when the comparing unit presents a selected one of the first and second output signals.

20 Claims, 5 Drawing Sheets

APPARATUS AND METHOD FOR CONTROLLING A POWER CONVERTER DEVICE

BACKGROUND OF THE INVENTION

The present invention is directed to protection of a power converter device during operation, and especially to protecting a power converter device against damage that may be caused by an excessive current condition.

One common implementation of a current protection scheme is a peak current limiter that prevents the maximum peak current from the power converter from exceeding a threshold peak current value. Peak current protection schemes are particularly useful in applications of power switching mode power converters because of the fast response by such schemes to over-current conditions and simple implementation of such schemes. A peak current control device works well when the duty cycle of the power converter is less than fifty percent. However, when the duty cycle of the power converter is greater than fifty percent, the peak current control device is not stable and exhibits a sub-harmonic oscillation. Another limitation of peak current control devices is sensitivity to switching noise. Designs of such peak current control devices must take into account such sensitivity to switching noise to avoid false alarms that may be caused by spurious noise injections. In applications where a precise maximum load current is desired, peak current control is unacceptable due to large variations in average load current as duty cycle varies.

There is a need for a current limit control apparatus and method for use with a power converter device that is substantially stable and exhibits little or no sub-harmonic oscillation.

There is a need for a current limit control apparatus and method for use with a power converter device that is substantially immune to noise.

There is also a need for a current limit control apparatus and method that can limit average load current in a manner that is substantially independent of duty cycle variations which may be caused by line voltage or load resistance.

SUMMARY OF THE INVENTION

An apparatus for controlling a power converter operating in response to a modulating signal during successive switching cycles includes: (a) A signal sensor coupled with the converter and sensing an extant signal during the extant cycle. (b) A signal level predictor coupled for receiving a reference signal and establishing a predicted level for the extant switching cycle. (c) A comparer coupled with the signal sensor and the signal level predictor for presenting a first output signal when the extant signal and the predicted signal level have a first relationship and for presenting a second output signal when the extant signal and the predicted signal level have a second relationship. (d) A control unit coupled with the comparer and with the converter for interrupting presentation of the modulating signal to the converter device when the comparing unit presents a selected one of the first and second output signals.

A method for effecting current limit control for a power converter device operating in response to a modulating signal during a plurality of successive switching cycles includes the steps of: (a) in no particular order: (1) providing an extant signal level sensing unit coupled with the power converter device; (2) providing a signal level predicting unit coupled for receiving a reference signal; (3) providing a comparing unit coupled with the signal level sensing unit and the signal level predicting unit; and (4) providing a control unit coupled with the comparing unit and with the power converter device; (b) operating the signal level sensing unit to sense an extant signal during an extant switching cycle of the plurality of successive switching cycles; (c) operating the signal level predicting unit to establish a predicted signal level for the extant switching cycle; (d) operating the comparing unit to present a first output signal when the extant signal is less than the predicted signal level and to present a second output signal when the extant signal is greater than the predicted signal; and (e) operating the control unit to prevent presentation of the modulating signal to the power converter device when the comparing unit presents the second output signal.

It is, therefore, an object of the present invention to provide a current limit control apparatus and method for use with a power converter device that is substantially stable and exhibits little or no sub-harmonic oscillation.

It is a further object of the present invention to provide a current limit control apparatus and method for use with a power converter device that is substantially immune to noise.

It is a further object of the present invention to provide a current limit control apparatus and method for use with a power converter device that limits average load current in a manner that is substantially independent of duty cycle variations.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

The term "locus" is intended herein to indicate a place, location, locality, locale, point, position, site, spot, volume, juncture, junction or other identifiable location-related zone in one or more dimensions. A locus in a physical apparatus may include, by way of example and not by way of limitation, a corner, intersection, curve, line, area, plane, volume or a portion of any of those features. A locus in an electrical apparatus may include, by way of example and not by way of limitation, a terminal, wire, circuit, circuit trace, circuit board, wiring board, pin, connector, component, collection of components, sub-component or other identifiable location-related area in one or more dimensions. A locus in a flow chart may include, by way of example and not by way of limitation, a juncture, step, site, function, query, response or other aspect, step, increment or an interstice between junctures, steps, sites, functions, queries, responses or other aspects of the flow or method represented by the chart.

The current invention is designed to provide current limit protection for a power converting device. The description that follows uses the terms "current" and "voltage" in various contexts. One skilled in the art will recognize that some circuitry disclosed herein will require conversion of a current to a voltage, or conversion of a voltage to a current, in order for portions of the circuitry to properly function.

Figure 1:
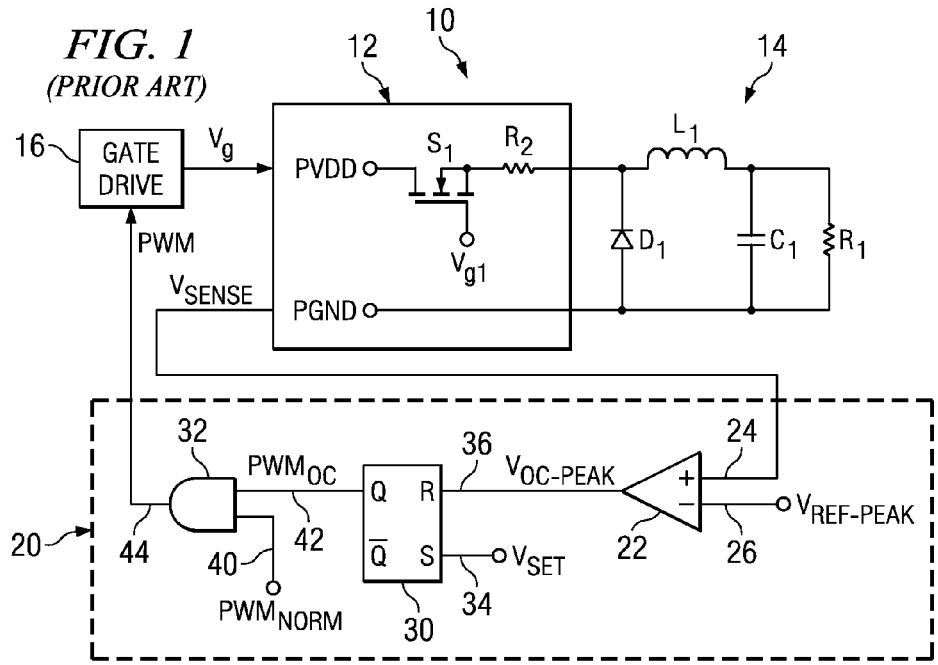
FIG. 1 is an electrical schematic diagram of a representative switching power converter device with a peak current protection apparatus configured according to the prior art.

FIG. 1 is an electrical schematic diagram of a representative switching power converter device with a peak current protection apparatus configured according to the prior art. In FIG. 1, a power converter device 10 includes a switching section 12, an output section 14 and a gate drive 16. Switching section 12 includes a power switch $S_1$ that closes and opens during successive switching cycles in response to a gating signal $V_g$. Output section 14 includes an output inductor $L_1$, an output diode $D_1$, and output capacitor $C_1$ and a load resistance $R_1$. Gate drive 16 provides gating signal $V_g$ for driving power switch $S_1$ in switching section 12 to effect power conversion in a manner known to one skilled in the art of switching power converters. Switching section 12 may be configured to embody power converter device 10 as a buck converter, a boost converter or another power converter device. A sensed signal $V_{SENSE}$ is provided from switching section 12 to indicate a parameter associated with operation of power converter device 10 such as, by way of example and not by way of limitation, output current through output inductor $L_1$. Sensed signal $V_{SENSE}$ is indicated here as a voltage, but could as well be a sensed current signal (e.g., $I_{SENSE}$) or another sensed signal. Sensed signal $V_{SENSE}$ may be regarded as directly indicative of current through inductor $L_1$ as a constant value "k" multiplying current through inductor $L_1$, according to the relationship:

$$V_{SENSE} = k \cdot I_{L1} \quad [1]$$

A peak current limit control unit 20 is coupled to receive sensed signal $V_{SENSE}$. Peak current limit control unit 20 includes a comparator 22. Comparator 22 receives sensed signal $V_{SENSE}$ at a non-inverting input locus 24 and receives a threshold peak reference signal $V_{REF-PEAK}$ at an inverting input locus 26. Peak current limit control unit 20 also includes a latch unit 30 and a logic unit 32. Latch unit 30 is periodically set by application of a clock signal $V_{SET}$ at a set locus 34. Latch unit 30 receives an output signal at a reset locus 36 from comparator 22. Comparator 22 presents an output signal $V_{OC-PEAK}$ at a "1" value when sensed signal $V_{SENSE}$ is greater than threshold peak reference signal $V_{REF-PEAK}$. Logic unit 32 is preferably embodied in an AND gate receiving a pulse width modulation signal $PVM_{NORM}$ at a first input locus 42 and receiving a signal $PWM_{OC}$ at a second input locus 44 from latch unit 30. Logic unit 32 presents a "1" signal at an output locus 44 when both signals at input loci 40, 42 are a "1" signal. Logic unit 32 presents a "0" signal at output locus 44 when one or more signals at input loci 40, 42 are a "0" signal.

During normal operation (assuming a fixed load for purposes of this description) the output signal presented at output locus 44 drives gate drive 16 to effect generation of gating signal $V_g$ and thereby control current through output inductor $L_1$ in response to pulse width modulation (PWM) signal $PWM_{NORM}$. When power switch $S_1$ in switching section 12 is closed current through output inductor $L_1$ increases. When power switch $S_1$ in switching section 12 is open current through output inductor $L_1$ decreases. A real time parameter associated with inductor $L_1$ (or with switch $S_1$) is sampled during on-time (i.e., when switch $S_1$ is closed). By way of example and not by way of limitation, the parameter sampled may be voltage across a resistor $R_2$ in series with switch $S_1$ or voltage across the on-resistance of switch $S1$, or may be current through inductor $L_1$ or through switch $S_1$. In the exemplary embodiment illustrated in FIG. 1, the parameter sampled is voltage $V_{SENSE}$ across resistor $R_2$ which is compared with threshold peak reference signal $V_{REF-PEAK}$ by comparator 22. When voltage $V_{SENSE}$ is greater than threshold peak reference signal $V_{REF-PEAK}$ comparator 22 and latch unit 30 cooperate to present signal $PWM_{OC}$ to logic unit 32 as a "0" signal. Presentation of a "0" signal to logic unit 32 causes the signal at output locus 44 of logic unit 32 to go to "0", thereby turning off power switch $S_1$ earlier than would occur in response to normal PWM signal $PWM_{NORM}$. Turning off power switch $S_1$ early effects reduction of current through inductor $L_1$, so that the maximum peak current through inductor $L_1$ is controlled by threshold peak reference signal $V_{REF-PEAK}$.

As mentioned earlier herein, peak current limit control unit 20 works well when the duty cycle of the power converter device 10 is less than fifty percent. However, when the duty cycle of the power converter device 10 is greater than fifty percent, peak current limit control unit 20 is not stable, may exhibit a sub-harmonic oscillation. Furthermore, for any duty cycle, the peak current control may be sensitive to switching noise.

Figure 2:
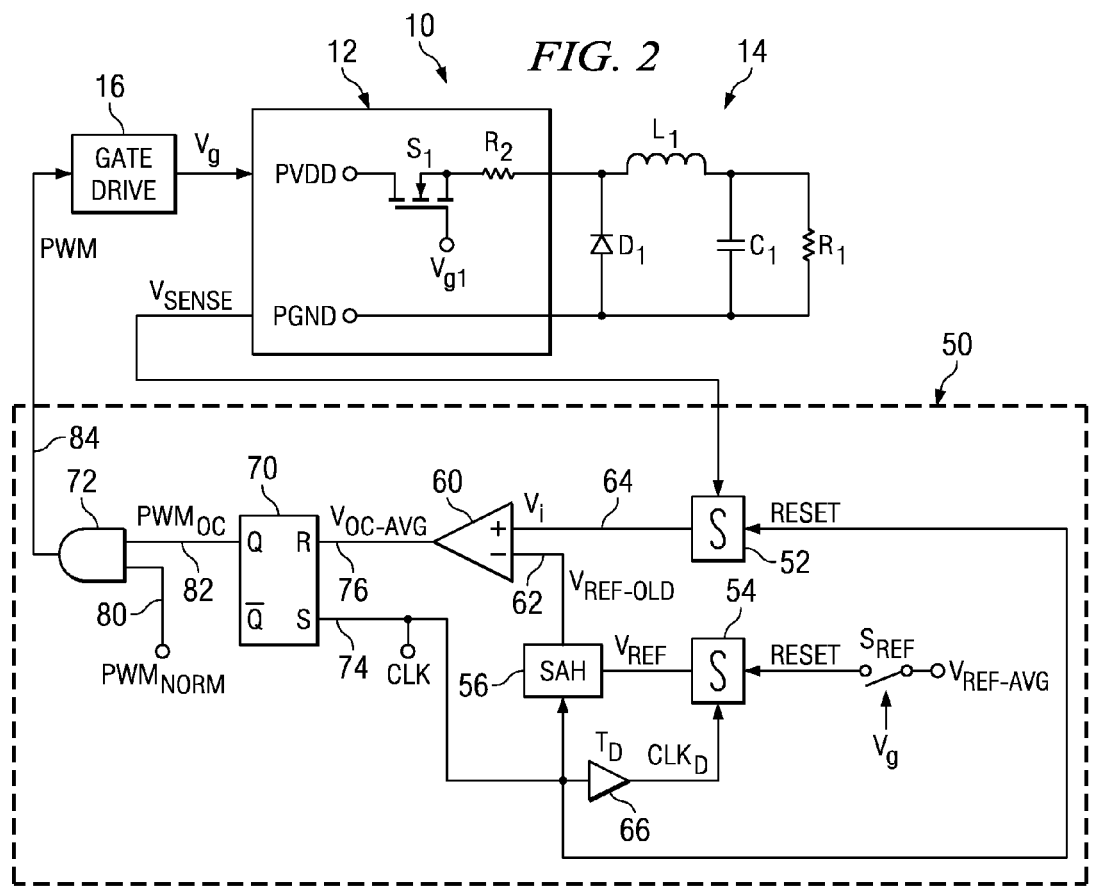
FIG. 2 is an electrical schematic diagram of a representative switching power converter device with a first embodiment of a current limit control apparatus configured according to the present invention.

FIG. 2 is an electrical schematic diagram of a representative switching power converter device with a first embodiment of a current limit control apparatus configured according to the present invention. In FIG. 2, a power converter device 10 is configured substantially as illustrated and described in connection with FIG. 1. In the interest of avoiding prolixity, the description of power converter device 10 will not be repeated here.

An adaptive cycle-by-cycle average current control unit 50 is coupled to receive sensed signal $V_{SENSE}$. Current control unit 50 includes a first integrator unit 52 and a second integrator unit 54. First integrator unit 52 receives sensed signal $V_{SENSE}$. Second integrator unit 54 receives an average signal reference signal $V_{REF-AVG}$ via a switch $S_{REF}$. Switch $S_{REF}$ is controlled by gating signal $V_g$. Second integrator unit 54 integrates reference signal $V_{REF-AVG}$ with respect to time to present an integrated reference signal $V_{REF}$ to a sample-and-hold (SAH) circuit 56. SAH circuit 56 holds integrated reference signal $V_{REF}$ so as to provide an old integrated reference signal $V_{REF-OLD}$ to an inverting input locus 62 of a comparator 60. First integrator unit 52 integrates sensed signal $V_{SENSE}$ with respect to time to present an integrated sensed signal $V_i$ to a non-inverting input locus 64 of comparator 60.

Current control unit 50 also includes a latch unit 70 and a logic unit 72. Latch unit 70 is periodically set by application of a clock signal CLK at a set locus 74. Clock signal CLK is also applied to reset first integrator unit 52 and sample-and-hold circuit 56. Clock signal CLK is delayed for a delay period $T_D$ by a delay unit 66, and a delayed clock signal $CLK_D$ is applied to reset second integrator unit 54.

Latch unit 70 receives an output signal at a reset locus 76 from comparator 60. Comparator 60 presents an output signal $V_{OC-AVG}$ at a "1" value when integrated sensed signal $V_i$ is greater than old integrated reference signal $V_{REF-OLD}$. Logic unit 72 is preferably embodied in an AND gate receiving a pulse width modulation signal $PWM_{NORM}$ at a first input locus 80 and receiving a signal $PWM_{OC}$ at a second input locus 82 from latch unit 70. Logic unit 72 presents a "1" signal at an output locus 84 when both signals at input loci 80, 82 are a "1" signal. Logic unit 72 presents a "0" signal at output locus 84 when one or more signals at input loci 80, 82 are a "0" signal.

During normal operation (assuming a fixed load for purposes of this description) the output signal presented at output locus 84 drives gate drive 16 to effect generation of gating signal $V_g$ and thereby control current through output inductor $L_1$ in response to pulse width modulation (PWM) signal $PWM_{NORM}$. Operation of power converter device 10 in response to gating signal $V_g$ operating power switch $S_1$ is substantially as describer earlier herein in connection with FIG. 1. In order to avoid prolixity, that description will not be repeated here.

Parameter $V_{SENSE}$ is preferably a sensed voltage drop across a circuit component that is related to current through inductor $L_1$. In the exemplary embodiment illustrated in FIG. 2, the parameter sampled is voltage $V_{SENSE}$ across resistor $R_1$ in series with inductor $L_1$. Integrated sensed signal $V_1$ is compared with old integrated reference signal $V_{REF-OLD}$. Old integrated reference signal $V_{REF-OLD}$ is an integrated signal $V_{REF}$ from at least one previous switching cycle. Preferably, old integrated reference signal $V_{REF-OLD}$ is an integrated signal $V_{REF}$ from the previous switching cycle that occurred immediately earlier in time with respect to the currently extant switching cycle. Old integrated reference signal $V_{REF-OLD}$ is employed in current control unit 50 as a predicted value for average current in an extant switching cycle (switching cycles are established by PWM signal $PWM_{NORM}$, as altered by signal $PWM_{OC}$).

When integrated sensed signal $V_i$ is greater than old integrated reference signal $V_{REF-OLD}$, comparator 60 and latch unit 70 cooperate to present signal $PWM_{OC}$ to logic unit 72 as a "0" signal. Presentation of a "0" signal to logic unit 72 causes the signal at output locus 84 of logic unit 72 to go to "0", thereby turning off power switch $S_1$ earlier than would occur in response to normal PWM signal $PVM_{NORM}$. Turning off power switch $S_1$ early effects reduction of current through inductor $L_1$, so that the maximum peak current through inductor $L_1$ is controlled by old integrated reference signal $V_{REF-OLD}$ (employed in current control unit 50 as a predicted value for average current in an extant switching cycle).

In some applications employing a power converter device, load impedances may change differently depending upon operating conditions. By way of example and not by way of limitation, in a Class D amplifier application a speaker's load impedance may change as a function of audio frequency. Sometimes the minimum impedance for the amplifier is significantly lower than the nominal load, so an overload condition may occur that is caused by speaker impedance changes during some music transients. During a musical transient it is preferred to have an amplifier protect itself using current limiting rather than shut down immediately, thereby interrupting the music being played through the amplifier. On the other hand, if a load terminal is shorted to ground or if another ground condition occurs, it is desirable that the circuit be shut down quickly to protect the amplifier. The embodiment of the present invention illustrated in FIG. 3 provides an arrangement for discerning the difference between an overload condition and a short condition.

Figure 3:
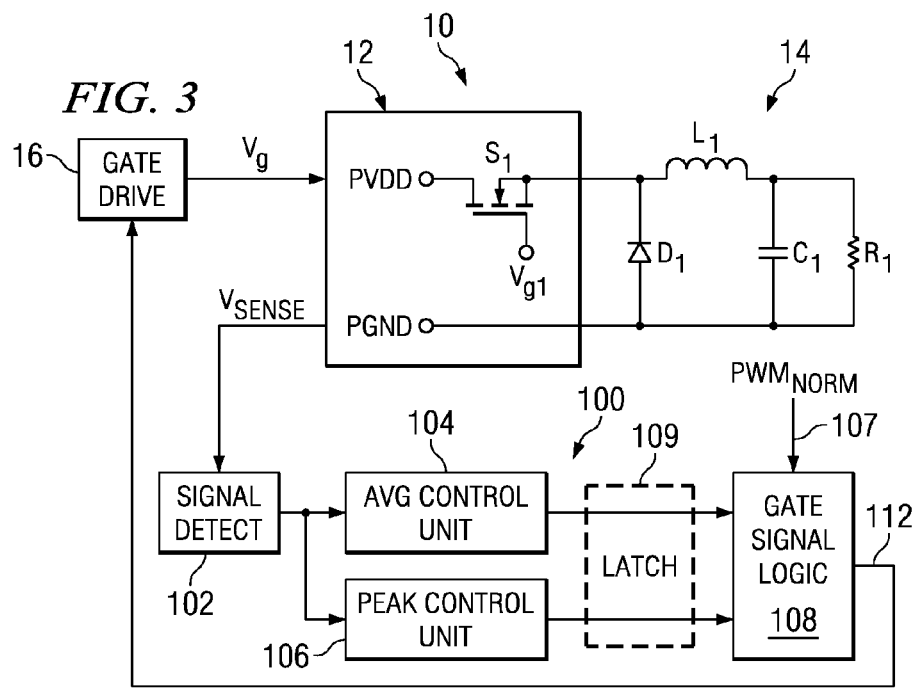
FIG. 3 is an electrical schematic diagram of a representative switching power converter device with a second embodiment of a current limit control apparatus configured according to the present invention.

FIG. 3 is an electrical schematic diagram of a representative switching power converter device with a second embodiment of a current limit control apparatus configured according to the present invention. In FIG. 3, a power converter device 10 is configured substantially as illustrated and described in connection with FIG. 1. In the interest of avoiding prolixity, the description of power converter device 10 will not be repeated here.

A combined current control unit 100 is coupled to receive sensed signal $V_{SENSE}$. Combined current control unit 100 includes a signal detect unit 102, an average current control unit 104, a peak current control unit 106 and gate signal logic unit 108. Signal detect unit 102 is preferably embodied to cooperate with average current control unit 104 to effect control of power converter device 10 substantially as control is effected by current control unit 50 an as described in connection with FIG. 2. Signal detect unit 102 is preferably further embodied to cooperate with peak current control unit 106 to effect control of power converter device 10 substantially as control is effected by current control unit 20 as described in connection with FIG. 1.

Gate signal logic unit 108 receives PWM signal $PWM_{NORM}$ at an input locus 107. Gate signal logic unit 108 logically combines signals received from average control unit 104 and peak control unit 106 to ensure that an indication from either control unit 104, 106 that a current limiting condition has occurred will effect turning off power switch $S_1$ earlier than would occur in response to normal PWM signal $PWM_{NORM}$. A latch unit 109 may be included to cooperate with gate logic unit 108 to effect desired logical combination of signals received from control units 104, 106. The optional nature of logic unit 109 is indicated by its dotted-line format.

Peak control unit 106 (configured substantially as described in connection with peak current limit control unit 20; FIG. 1) has a very fast and stable response during a short condition where power converter device 10 has a duty cycle less than fifty percent. Peak control unit 106 will quickly respond to a short condition to terminate application of gating signal $V_g$ to power converter device 10. Average control unit 104 uses a predictive reference signal (old integrated reference signal $V_{REF-OLD}$ as described in connection with current control circuit 50; FIG. 2) to accurately limit current using a normal current limiting mode (e.g., during a low speaker impedance condition), but average control unit has a slower response during the beginning of a short condition. Combined current control unit 100 provides appropriate speed for reacting to a short condition while also providing a slower response time for dealing with conditions where continued operation may be desired without effecting a complete shutdown of a device.

Combined current control unit 100 employs two thresholds. Average current control unit 104 uses predictive average current control, substantially as described in connection with current control unit 50 (FIG. 2). Peak current control unit 106 uses peak current control substantially as described in connection with peak current limit control unit 20 (FIG. 1). The lower level threshold is used to impose current limiting protection during a relatively slower occurring current increase such as, by way of example and not by way of limitation, a low speaker impedance condition. The higher level threshold is used to impose current limiting protection during a relatively faster occurring current increase such as, by way of example and not by way of limitation, a short condition. The first current control unit 104, 106 that reaches its threshold limit will control presentation of an over-current signal and interrupt the PWM signal $PWM_{NORM}$, as described in connection with FIGS. 2 and 3.

Figure 4:
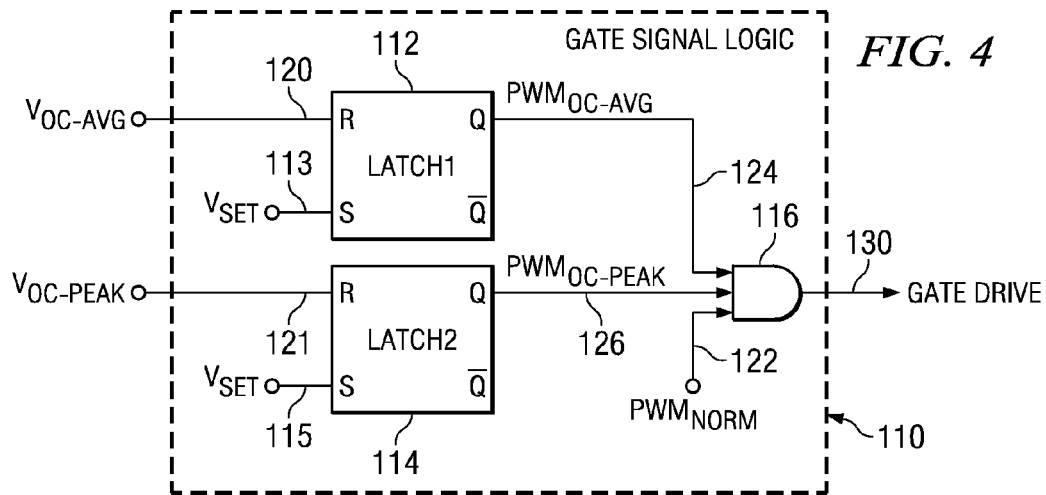
FIG. 4 is an electrical schematic diagram of a representative gate logic arrangement useful for employment with the current limit control apparatus illustrated in FIG. 3.

FIG. 4 is an electrical schematic diagram of a representative gate logic arrangement useful for employment with the current limit control apparatus illustrated in FIG. 3. In FIG. 4, a gate signal logic unit 110 (appropriate for use as gate signal logic unit 108; FIG. 3) includes a first latch unit 112, a second latch unit 114 and a logic unit 116. Latch unit 112 is periodically set by application of a clock signal $V_{SET}$ at a set locus 113. Latch unit 114 is periodically set by application of clock signal $V_{SET}$ at a set locus 115.

First latch unit 112 receives an over-current indicating signal $V_{OC-AVG}$ at a reset locus 120 from average current control unit 104 (FIG. 3). Average current control unit 104 presents over-current indicating signal $V_{OC-AVG}$ as a "1" value when current sensed in power converting device 10 exceeds a threshold established by average current control unit 104 (substantially as described in connection with current control unit 50; FIG. 2). When sensed current in power converter device 10 (FIG. 2) is greater than a predicted average current threshold level, first latch unit 112 presents a signal $PWM_{OC-AVG}$ to logic unit 116 as a "0" signal, substantially as described in connection with FIGS. 2 and 3.

Second latch unit 114 receives an over-current indicating signal $V_{OC-PEAK}$ at a reset locus 121 from peak current control unit 106 (FIG. 3). Peak current control unit 106 presents over-current indicating signal $V_{OC-PEAK}$ as a "1" value when current sensed in power converting device 10 exceeds a threshold established by peak current control unit 106 (substantially as described in connection with current control unit 20; FIG. 1). When sensed current in power converter device 10 (FIG. 1) is greater than a peak threshold current level, second latch unit 114 presents a signal $PWM_{OC-PEAK}$ to logic unit 116 as a "0" signal, substantially as described in connection with FIGS. 1 and 3.

Logic unit 116 is preferably embodied in an AND gate receiving a pulse width modulation signal $PWM_{NORM}$ at a first input locus 122, receiving a signal $PWM_{OC-AVG}$ at a second input locus 124 from first latch unit 112 and receiving a signal $PWM_{OC-PEAK}$ at a third input locus 126 from second latch unit 114. Logic unit 116 presents a "1" signal via an output locus 130 to gate drive 16 (FIGS. 2 and 3) when all signals at input loci 122, 124, 126 are a "1" signal. Logic unit 116 presents a "0" signal via output locus 130 to gate drive 16 when one or more signals at input loci 122, 124, 126 are a "0" signal.

Gate signal logic unit 110 assures that the first current control unit 104, 106 that reaches its threshold limit will control presentation of an over-current signal and interrupt the PWM signal $PWM_{NORM}$, as described in connection with FIGS. 2 and 3.

Figure 5:
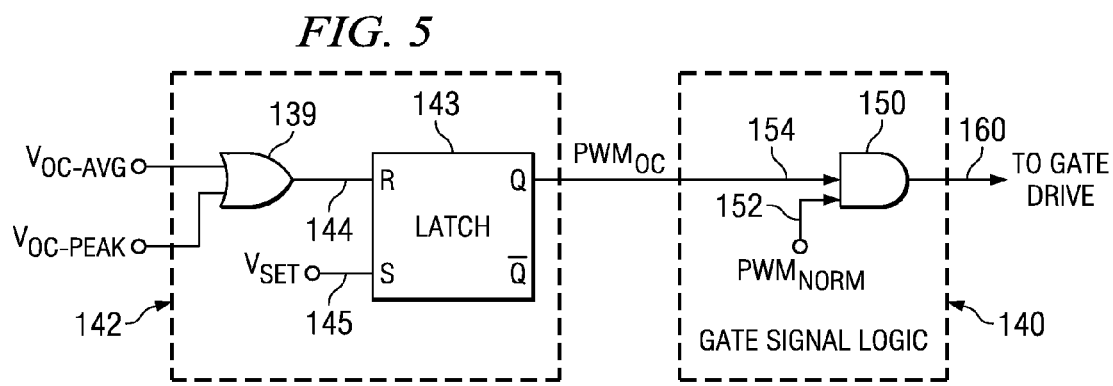
FIG. 5 is an electrical schematic diagram of a representative latch and gate logic arrangement useful for employment with the current limit control apparatus illustrated in FIG. 3.

FIG. 5 is an electrical schematic diagram of a representative latch and gate logic arrangement useful for employment with the current limit control apparatus illustrated in FIG. 3. In FIG. 5, a gate signal logic unit 140 (appropriate for use as gate signal logic unit 108; FIG. 3) and a latch unit 142 (appropriate for use as latch unit 109; FIG. 3) are illustrated. Latch unit 142 includes an OR gate 139 and a latch 143. Latch unit 142 receives an over-current indicating signal $V_{OC-AVG}$ at OR gate 139 from average current control unit 104 (FIG. 3). Average current control unit 104 presents over-current indicating signal $V_{OC-AVG}$ as a "1" value when current sensed in power converting device 10 exceeds a threshold established by average current control unit 104 (substantially as described in connection with current control unit 50; FIG. 2). Latch unit 142 also receives an over-current indicating signal $V_{OC-PEAK}$ at OR gate 139 from peak current control unit 106 (FIG. 3). Peak current control unit 106 presents over-current indicating signal $V_{OC-PEAK}$ as a "1" value when current sensed in power converting device 10 exceeds a threshold established by peak current control unit 106 (substantially as described in connection with current control unit 20; FIG. 1). OR gate 139 presents a "1" signal to a reset locus 144 of latch 143 when either of signals $V_{OC-AVG}$, $V_{OC-PEAK}$ is a "1" value. Latch 143 is periodically set by application of a clock signal $V_{SET}$ at a set locus 145.

When sensed current in power converter device 10 (FIG. 2) is greater than a predicted average current threshold level, latch 143 presents a signal $PWM_{OC}$ to logic unit 140 as a "0" signal, substantially as described in connection with FIGS. 2 and 3. When sensed current in power converter device 10 (FIG. 1) is greater than a peak threshold current level, latch 143 will also present a signal $PWM_{OC}$ to logic unit 140 as a "0" signal, substantially as described in connection with FIGS. 1 and 3.

Gate signal logic unit 140 is preferably embodied in an AND gate 150 receiving a pulse width modulation signal $PWM_{NORM}$ at a first input locus 152 and receiving signal $PWM_{OC}$ at a second input locus 154 from latch unit 142. Logic unit 150 presents a "1" signal via an output locus 160 to gate drive 16 (FIGS. 2 and 3) when both signals at input loci 152, 154 are a "1" signal. Logic unit 150 presents a "0" signal via output locus 160 to gate drive 16 when one or more signals at input loci 152, 154 are a "0" signal.

Gate signal logic unit 140 assures that the first current control unit 104, 106 that reaches its threshold limit will control presentation of an over-current signal and interrupt the PWM signal $PWM_{NORM}$, as described in connection with FIGS. 2 and 3.

Figure 6:
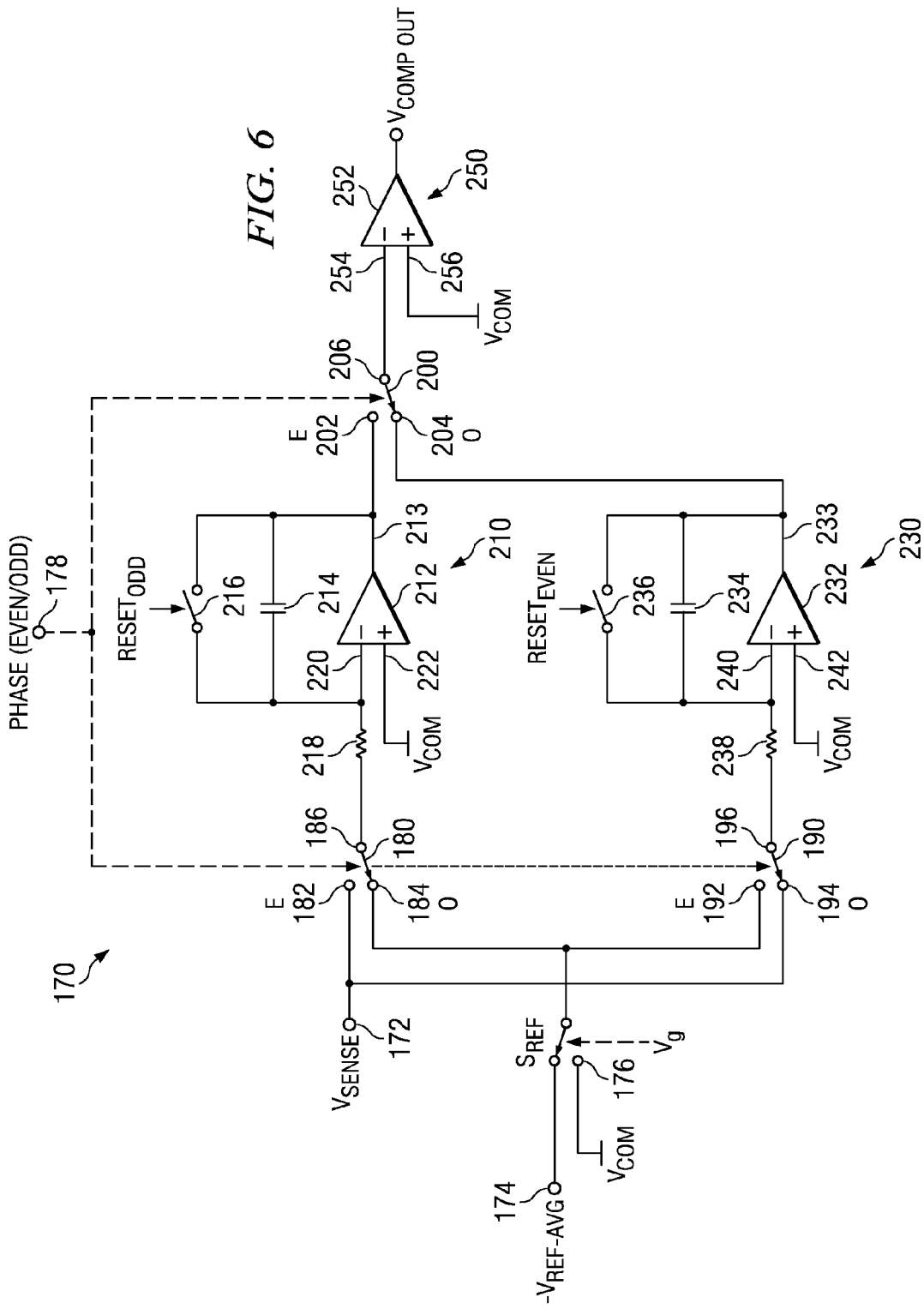
FIG. 6 is an electrical schematic diagram of a third embodiment of a current limit control apparatus configured according to the present invention.

A more accurate and more area-efficient and manufacturable embodiment for, generating predictive average current signal $V_{REF-OLD}$ from reference signal $V_{REF-AVG}$, and comparing this predicted signal with sensed signal $V_{SENSE}$ is presented in FIG. 6.

FIG. 6 is an electrical schematic diagram of a third embodiment of a current limit control apparatus configured according to the present invention. In FIG. 6, a comparing circuit 170 receives sensed signal $V_{SENSE}$ at a first input locus 172. An average reference signal $-V_{REF-AVG}$ is received at a second input locus 174. Signal $-V_{REF-AVG}$ is preferably substantially equal in magnitude to $V_{REF-AVG}$ of FIG. 2 and controls the target average current limit threshold. A common voltage $V_{COM}$ is a received at a third input locus 176. Voltage $V_{COM}$ may be electrical ground in some applications of comparing circuit 170.

Phase-responsive switches 180, 190, 200 respond to phase signals provided by a phase driver (not shown in FIG. 6) applying a phase signal to a phase input locus 178. Phase signals impose odd and even phases during alternate switching cycles established by a PWM signal such as PWM signal PWM$_{NORM}$ (FIGS. 1-5), or a clock signal CLK such as at locus 74 of FIG. 2. Phase-responsive switch 180 responds to phase signals received at phase input locus 178 to couple circuit locus 186 with even locus 182 during even phases and responds to phase signals received at phase input locus 178 to couple circuit locus 186 with odd locus 184 during odd phases. Phase-responsive switch 190 responds to phase signals received at phase input locus 178 to couple circuit locus 196 with even locus 192 during even phases and responds to phase signals received at phase input locus 178 to couple circuit locus 196 with odd locus 194 during odd phases. Phase-responsive switch 200 responds to phase signals received at phase input locus 178 to couple circuit locus 206 with even locus 202 during even phases and responds to phase signals received at phase input locus 178 to couple circuit locus 206 with odd locus 204 during odd phases. Gating signal V$_g$ effects gating of reference sampling switch S$_{REF}$ during each switching cycle substantially as described in connection with FIG. 2.

An integrator unit 210 includes an operational amplifier 212 with a capacitor 214 coupled between an output locus 213 and an inverting input locus 220. Operational amplifier 212 receives voltage V$_{COM}$ at a non-inverting input locus 222. Signals appearing at circuit locus 186 are applied to inverting input locus 220 via a resistor 218. A reset switch 216 is coupled in parallel with capacitor 214. Reset switch 216 responds to a RESET$_{ODD}$ signal that is applied to close reset switch 216 at substantially the beginning of each odd phase. Reset switch 216 is preferably kept closed only long enough to substantially discharge capacitor 214. Signals appearing at output locus 213 are provided to even circuit locus 202.

An integrator unit 230 includes an operational amplifier 232 with a capacitor 234 coupled between an output locus 233 and an inverting input locus 240. Operational amplifier 232 receives voltage V$_{COM}$ at a non-inverting input locus 242. Signals appearing at circuit locus 196 are applied to inverting input locus 240 via a resistor 238. A reset switch 236 is coupled in parallel with capacitor 234. Reset switch 236 responds to a RESET$_{EVEN}$ signal that is applied to close reset switch 236 at substantially the beginning of each even phase. Reset switch 236 is preferably kept closed only long enough to substantially discharge capacitor 234. Signals appearing at output locus 233 are provided to odd circuit locus 204.

An output section 250 is preferably embodied in a comparator unit 252. Comparator unit 252 receives signals appearing at circuit locus 206 at an inverting input locus 254. Comparator unit 252 receives voltage V$_{COM}$ at a non-inverting input locus 256.

When comparing circuit 170 is responding to an odd phase signal received at phase input locus 178, circuit locus 186 is coupled with odd locus 184, circuit locus 196 is coupled with odd locus 194 and circuit locus 206 is coupled with odd locus 204. When applied gating signal V$_g$ couples switch S$_{REF}$ with second input locus 174, signal –V$_{REF-AVG}$ is applied to integrator unit 210 via switch 180. Integrator unit 210 presents a predictive time-integrated reference signal at output locus 213, which at the end of the odd cycle (and the beginning of the even cycle) is substantially equal to signal V$_{REF-OLD-AVG}$ in FIG. 2. The reference signal voltage is stored on capacitor 214, where it will provide an initial condition for the V$_{SENSE}$ signal integration phase in the next even cycle. However, during the current odd cycle, switch 206 is coupled with odd locus 204, so no connection is provided with output locus 213. Instead, switch 200 is delivering to output section 250 the time-integrated signal V$_{SENSE}$ accumulating negative charge on integrator unit 230 at output locus 233 during a the current odd cycle. At the beginning of the next cycle, an even cycle, reset signal RESET$_{EVEN}$ is applied to discharge capacitor 236, comparing circuit 170 responds to an even phase signal received at phase input locus 178, circuit locus 186 is coupled with even locus 182, circuit locus 196 is coupled with even locus 192 and circuit locus 206 is coupled with even locus 202. When applied gating signal V$_g$ couples switch S$_{REF}$ with second input locus 174, signal –V$_{REF-AVG}$ is applied to integrator unit 230 via switch 190. Integrator unit 230 presents a predictive time-integrated reference signal at output locus 233 which at the end of the even cycle (and the beginning of the next odd cycle) is substantially equal to signal V$_{REF-OLD-AVG}$ in FIG. 2. However, switch 206 is coupled with even locus 202, so no connection is provided with output locus 233. Instead, switch 200 is delivering to output section 250 the difference between time-integrated current sense signal V$_{SENSE}$ and the initial condition V$_{REF-OLD-AVG}$ that had been accumulated at output locus 213 during the previous odd cycle. If the time integral of voltage V$_{SENSE}$ in the current cycle is larger than the initial condition held on capacitor 214, then the voltage at locus 254 will go negative with respect to the voltage at locus 256 (V$_{COM}$), and comparator 250 will produce an output logic "1" at V$_{COMP\_OUT}$, which can be used to terminate the PWM signal as signal V$_{OC-AVG}$ does at locus 76 in FIG. 2.

A current-oriented version of comparing circuit 170 can be useful in some applications. The embodiment of the present invention illustrated in FIG. 7 is a current-oriented version of comparing circuit 170.

Figure 7:
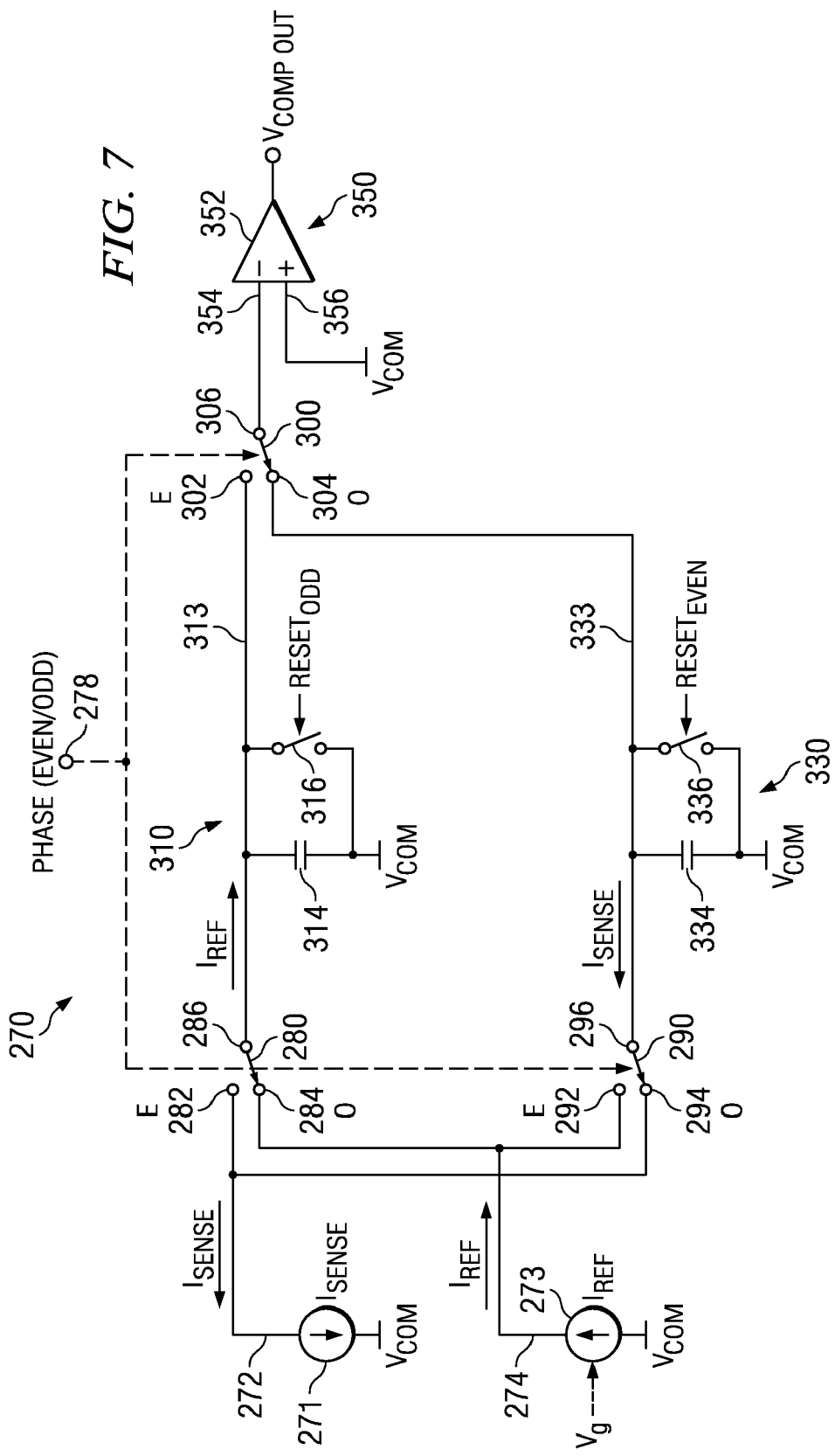
FIG. 7 is an electrical schematic diagram of a representative switching power converter device with a fourth embodiment of a current limit control apparatus configured according to the present invention.

FIG. 7 is an electrical schematic diagram of a fourth embodiment of a current limit control apparatus configured according to the present invention. In FIG. 7, a comparing circuit 270 includes a current source 271 presenting a sensed current I$_{SENSE}$ at a first input locus 272. A current source 273 presents a reference current I$_{REF}$ at a second input locus 274. Reference current I$_{REF}$ is preferably related with V$_{REF-AVG}$ (FIG. 2) and controls the target average current limit threshold. Current source 273 is switchingly connected with common voltage V$_{COM}$ in response to gating signal V$_g$ such that I$_{REF}$ will be interrupted to zero current when the gate signal is zero (details of switch structure are not included in FIG. 7). Voltage V$_{COM}$ may be electrical ground in some applications of comparing circuit 270.

Phase-responsive switches 280, 290, 300 respond to phase signals provided by a phase driver (not shown in FIG. 7) applying a phase signal to a phase input locus 278. Phase signals impose odd and even phases during alternate switching cycles established by a PWM signal such as PWM signal PWM$_{NORM}$ (FIGS. 1-5) or a clock signal CLK such as at locus 74 of FIG. 2. Phase-responsive switch 280 responds to phase signals received at phase input locus 278 to couple circuit locus 286 with even locus 282 during even phases and responds to phase signals received at phase input locus 278 to couple circuit locus 286 with odd locus 284 during odd phases. Phase-responsive switch 290 responds to phase signals received at phase input locus 278 to couple circuit locus 296 with even locus 292 during even phases and responds to phase signals received at phase input locus 278 to couple circuit locus 296 with odd locus 294 during odd phases. Phase-responsive switch 300 responds to phase signals received at phase input locus 278 to couple circuit locus 306 with even locus 302 during even phases and responds to phase signals received at phase input locus 278 to couple circuit locus 306 with odd locus 304 during odd phases.

An integrator unit 310 includes a capacitor 314 coupled between an output locus 213 and voltage $V_{COM}$. Currents appearing at circuit locus 286 are applied to capacitor 314 and charge capacitor 314 over time. Capacitor 314 thereby operates as an integrator storing an increasing time-integrated signal over time. A reset switch 316 is coupled in parallel with capacitor 314. Reset switch 316 responds to a $RESET_{ODD}$ signal that is applied to close reset switch 316 at substantially the beginning of each odd phase. Reset switch 316 is preferably kept closed only long enough to substantially discharge capacitor 314. Signals appearing at output locus 313 are provided to even circuit locus 302.

An integrator unit 330 includes a capacitor 334 coupled between an output locus 333 and voltage $V_{COM}$. Currents appearing at circuit locus 296 are applied to capacitor 334 and charge capacitor 334 over time. Capacitor 334 thereby operates as an integrator storing an increasing time-integrated signal over time. A reset switch 336 is coupled in parallel with capacitor 334. Reset switch 336 responds to a $RESET_{EVEN}$ signal that is applied to close reset switch 336 at the substantially at the beginning of each even phase. Reset switch 336 is preferably kept closed only long enough to substantially discharge capacitor 334. Signals appearing at output locus 333 are provided to even circuit locus 304.

An output section 350 is preferably embodied in a comparator unit 352. Comparator unit 352 receives signals appearing at circuit locus 306 at an inverting input locus 354. Comparator unit 352 receives voltage $V_{COM}$ at a non-inverting input locus 356.

When comparing circuit 270 is responding to an odd phase signal received at phase input locus 278, circuit locus 286 is coupled with odd locus 284, circuit locus 296 is coupled with odd locus 294 and circuit locus 306 is coupled with odd locus 304. When applied gating signal $V_g$ applies reference current $I_{REF}$ to second input locus 274, reference current $I_{REF}$ is applied to integrator unit 310 via switch 280. Integrator unit 310, which was reset to $V_{COM}$ at the start of the odd cycle, presents a time-integrated reference signal at output locus 313, which will increase positively as long as $I_{REF}$ is positive. At the end of the odd cycle (and the beginning of the next even cycle) the voltage at locus 313 will be substantially equal to signal $V_{REF-OLD-AVG}$ in FIG. 2. The predictive reference voltage is stored on capacitor 314, where it will provide an initial condition for the $I_{SENSE}$ signal integration phase in the next even cycle. However, during the extant odd cycle, switch 306 is coupled with odd locus 304, so no connection is provided with output locus 313. Instead, switch 300 is delivering to output section 350 the difference between the initial condition of capacitor 334 (accumulated during a previous even cycle) and the time-integrated value of the current cycle's $I_{SENSE}$ signal. If the integral of $I_{SENSE}$ in the current cycle exceeds the charge accumulated by the integration of $I_{REF}$ in the previous cycle, then the comparator unit 350 will produce a "1" at the output, which can be used to terminate the PWM signal as signal $V_{OC-AVG}$ does at locus 76 in FIG. 2.

At the beginning of the next cycle, an even cycle, reset signal $RESET_{EVEN}$ is applied to discharge capacitor 334, comparing circuit 270 responds to an even phase signal received at phase input locus 278, circuit locus 286 is coupled with even locus 282, circuit locus 296 is coupled with even locus 292 and circuit locus 306 is coupled with even locus 302. When applied gating signal $V_g$ applies reference current $I_{REF}$ to second input locus 2, reference current $I_{REF}$ is applied to integrator unit 330 via switch 290. Integrator unit 330, which was reset to $V_{COM}$ at the start of the even cycle, presents a time-integrated reference signal at output locus 333, which will increase positively as long as $I_{REF}$ is positive. At the end of the even cycle (and the beginning of the next odd cycle) the voltage at locus 333 will be substantially equal to signal $V_{REF-OLD-AVG}$ in FIG. 2. The predictive reference voltage is stored on capacitor 334, where it will provide an initial condition for the $I_{SENSE}$ signal integration phase in the next odd cycle. However, during the extant even cycle, locus 306 is coupled with even locus 302, so no connection is provided with output locus 333. Instead, switch 300 is delivering to output section 350 the difference between the initial condition of capacitor 314 (accumulated during a previous odd cycle) and the time-integrated value of the current cycle's $I_{SENSE}$ signal. If the integral of $I_{SENSE}$ in the current cycle exceeds the charge accumulated by the integration of $I_{REF}$ in the previous cycle, then comparator unit 350 will produce a "1" at the output, which can be used to terminate the PWM signal as signal $V_{OC-AVG}$ does at locus 76 in FIG. 2.

Figure 8:
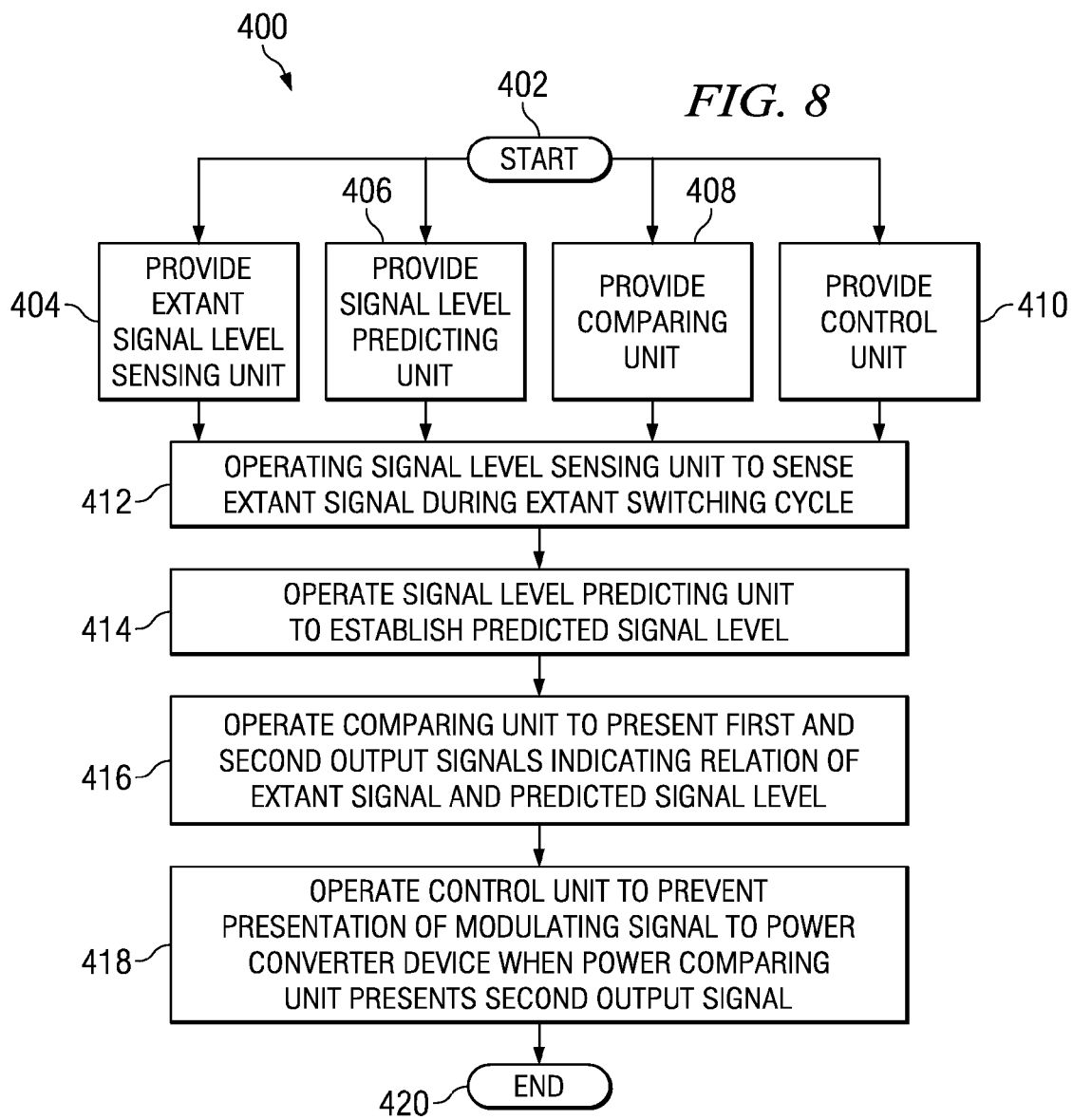
FIG. 8 is a flow chart illustrating the method of the present invention.

FIG. 8 is a flow chart illustrating the method of the present invention. In FIG. 8, a method 400 for effecting current limit control for a power converter device operating in response to a modulating signal during a plurality of successive switching cycles begins at a START locus 402. Method 400 continues with, in no particular order: (1) providing an extant signal level sensing unit coupled with the power converter device, as indicated by a block 404; (2) providing a signal level predicting unit coupled for receiving a reference signal, as indicated by a block 406; (3) providing a comparing unit coupled with the signal level sensing unit and the signal level predicting unit, as indicated by a block 408; and (4) providing a control unit coupled with the comparing unit and with the power converter device, as indicated by a block 410.

Method 400 continues with operating the signal level sensing unit to sense an extant signal during an extant switching cycle of the plurality of successive switching cycles, as indicated by a block 412. Method 400 continues with operating the signal level predicting unit to establish a predicted signal level for the extant switching cycle, as indicated by a block 414. Method 400 continues with operating the comparing unit to present a first output signal when the extant signal is less than the predicted signal level and to present a second output signal when the extant signal is greater than the predicted signal, as indicated by a block 416. Method 400 continues with operating the control unit to prevent presentation of the modulating signal to the power converter device when the comparing unit presents the second output signal, as indicated by a block 418. Method 400 terminates at an END locus 420.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:
1. An apparatus for effecting current limit control for a power converter device; said power converter device operating in response to a modulating signal during a plurality of successive switching cycles; the apparatus comprising:
 (a) an extant signal level sensing unit coupled with said power converter device; said extant signal level sensing unit sensing an extant signal during said extant switching cycle;

(b) a signal level predicting unit coupled for receiving a reference signal; said signal level predicting unit establishing a predicted signal level for an extant switching cycle of said plurality of successive switching cycles;

(c) a comparing unit coupled with said signal level sensing unit and said signal level predicting unit; said comparing unit presenting a first output signal when said extant signal and said predicted signal level have a first relationship; said comparing unit presenting a second output signal when said extant signal and said predicted signal level have a second relationship; and (d) a control unit coupled with said comparing unit and with said power converter device; said control unit permitting presentation of said modulating signal to said power converter device when said comparing unit presents one output signal of said first output signal and said second output signal; said control unit interrupting presentation of said modulating signal to said power converter device when said comparing unit presents another output signal of said first output signal and said second output signal than said one output signal.

2. An apparatus for effecting current limit control for a power converter device as recited in claim 1 wherein said signal level predicting unit integrates said reference signal during at least one preceding switching cycle of said plurality of successive switching cycles earlier than said extant switching cycle for establishing said predicted signal level for said extant switching cycle.

3. An apparatus for effecting current limit control for a power converter device as recited in claim 1 wherein said extant signal is at least one extant signal sample integrated with respect to time.

4. An apparatus for effecting current limit control for a power converter device as recited in claim 1 wherein said control unit interrupts presentation of said modulating signal to said power converter device when said extant signal is greater than said predicted signal level.

5. An apparatus for effecting current limit control for a power converter device as recited in claim 2 wherein said extant signal is at least one extant signal sample integrated with respect to time.

6. An apparatus for effecting current limit control for a power converter device as recited in claim 5 wherein said control unit interrupts presentation of said modulating signal to said power converter device when said extant signal is greater than said predicted signal level.

7. An apparatus for effecting current limit control for a power converter device as recited in claim 1 wherein the apparatus further comprises:

(e) a peak signal level detecting unit coupled with said power converter device and with said control unit; said peak level detecting unit sensing a second extant signal during said extant switching cycle; said peak level detecting unit presenting a first peak indicating signal when said second extant signal is less than a predetermined peak reference signal level; said peak level detecting unit presenting a second peak indicating signal when said second extant signal is greater than said predetermined peak reference signal level; said control unit interrupting presentation of said modulating signal to said power converter device when either:

(1) said comparing unit presents said another output signal; or (2) said peak signal level detecting unit presents said second peak indicating signal.

8. An apparatus for effecting current limit control for a power converter device as recited in claim 1 wherein said extant signal is a voltage signal.

9. An apparatus for effecting current limit control for a power converter device as recited in claim 2 wherein said extant signal is a voltage signal.

10. An apparatus for effecting current limit control for a power converter device as recited in claim 7 wherein at least one of said extant signal and said second extant signal is a voltage signal.

11. An apparatus for effecting current limit control for a power converter device as recited in claim 1 wherein said extant signal is a current signal.

12. An apparatus for effecting current limit control for a power converter device as recited in claim 2 wherein said extant signal is a current signal.

13. An apparatus for effecting current limit control for a power converter device as recited in claim 7 wherein at least one of said extant signal and said second extant signal is a current signal.

14. An apparatus for controlling a power converter device; said power converter device operating to present an output signal at an output locus in response to a modulating signal received at a gating signal locus during a plurality of successive switching cycles; the apparatus comprising:

(a) an extant signal level sensing unit coupled with said output locus; said extant signal level sensing unit sensing a first extant signal during said extant switching cycle; said first extant signal being related to said output signal;

(b) a signal level predicting unit coupled for receiving a reference signal; said signal level predicting unit establishing a predicted signal level for an extant switching cycle of said plurality of successive switching cycles;

(c) a comparing unit coupled with said signal level predicting unit and said signal level sensing unit; said comparing unit presenting a first output signal when said first extant signal is greater than said predicted signal level; said comparing unit presenting a second output signal when said first extant signal is less than said predicted signal level;

(d) a peak signal level detecting unit coupled with said output locus; said peak signal level detecting unit sensing a second extant signal during said extant switching cycle; said peak level detecting unit presenting a first peak indicating signal when said second extant signal is less than a predetermined reference signal level; said peak level detecting unit presenting a second peak indicating signal when said second extant signal is greater than said predetermined reference signal level; and (e) a control unit coupled with said comparing unit, with said power converter device and with said gating signal locus; said control unit preventing presentation of said modulating signal to said power converter device when either:

(1) said comparing unit presents said first output signal; or (2) said peak signal level detecting unit presents said second peak indicating signal.

15. An apparatus for controlling a power converter device as recited in claim 14 wherein said signal level predicting unit integrates said reference signal during at least one preceding switching cycle of said plurality of successive switching cycles earlier than said extant switching cycle for establishing said predicted signal level for said extant switching cycle.

16. An apparatus for controlling a power converter device as recited in claim 14 wherein said extant signal is at least one extant signal sample integrated with respect to time.

17. An apparatus for controlling a power converter device as recited in claim 15 wherein said extant signal is at least one extant signal sample integrated with respect to time.

18. A method for effecting current limit control for a power converter device; said power converter device operating in response to a modulating signal during a plurality of successive switching cycles; the method comprising the steps of:
 (a) in no particular order:
  (1) providing an extant signal level sensing unit coupled with said power converter device;
  (2) providing a signal level predicting unit coupled for receiving a reference signal;
  (3) providing a comparing unit coupled with said signal level sensing unit and said signal level predicting unit; and
  (4) providing a control unit coupled with said comparing unit and with said power converter device;
 (b) operating said signal level sensing unit to sense an extant signal during an extant switching cycle of said plurality of successive switching cycles;
 (c) operating said signal level predicting unit to establish a predicted signal level for said extant switching cycle;
 (d) operating said comparing unit to present a first output signal when said extant signal is less than said predicted signal level and to present a second output signal when said extant signal is greater than said predicted signal; and
 (e) operating said control unit to prevent presentation of said modulating signal to said power converter device when said comparing unit presents said second output signal.

19. A method for effecting current limit control for a power converter device as recited in claim 18 wherein said signal level predicting unit integrates said reference signal during at least one preceding switching cycle of said plurality of successive switching cycles earlier than said extant switching cycle for establishing said predicted signal level for said extant switching cycle.

20. A method for effecting current limit control for a power converter device as recited in claim 18 wherein said extant signal is at least one extant signal sample integrated with respect to time.

* * * * *